US009973910B1

(12) United States Patent
Dannamaneni et al.

(10) Patent No.: US 9,973,910 B1
(45) Date of Patent: May 15, 2018

(54) MOBILE CONTENT DISTRIBUTION SYSTEM

(71) Applicant: Sprint Communications Company L.P., Overland Park, KS (US)

(72) Inventors: Prashanth Dannamaneni, Merriam, KS (US); Matthew Habiger, Kansas City, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days. days.

(21) Appl. No.: 15/483,891

(22) Filed: Apr. 10, 2017

(51) Int. Cl.
*H04W 4/02* (2018.01)
*H04W 4/18* (2009.01)
*H04W 4/20* (2018.01)
*H04W 4/00* (2018.01)
*H04L 29/08* (2006.01)

(52) U.S. Cl.
CPC ........... *H04W 4/206* (2013.01); *H04L 67/306* (2013.01); *H04W 4/003* (2013.01)

(58) Field of Classification Search
CPC .... H04W 4/206; H04W 4/003; H04L 67/306; G06Q 30/00; G06Q 30/02; G06F 15/16; G06F 17/30; H04M 3/42
USPC ....................................................... 455/466
See application file for complete search history.

(56) References Cited

U.S. PATENT DOCUMENTS

| | | | | |
|---|---|---|---|---|
| 8,156,116 | B2 * | 4/2012 | Graham | G06F 17/30035 705/14.4 |
| 9,384,500 | B2 * | 7/2016 | Ramer | G06Q 30/02 |
| 2006/0265507 | A1 * | 11/2006 | Banga | G06F 17/30867 709/228 |
| 2007/0061195 | A1 * | 3/2007 | Liu | G06Q 30/02 705/14.41 |
| 2010/0082775 | A1 * | 4/2010 | Banga | G06F 17/30867 709/219 |
| 2011/0225048 | A1 * | 9/2011 | Nair | G06Q 30/02 705/14.66 |
| 2014/0149217 | A1 * | 5/2014 | Steenstra | H04W 4/02 705/14.55 |

FOREIGN PATENT DOCUMENTS

WO     WO 2010078539 A2 *  7/2010  ............. G06Q 30/02

* cited by examiner

*Primary Examiner* — Nathan Taylor

(57) ABSTRACT

A method of mobile content distribution. The method comprises receiving requests to provide mobile content to a mobile communication device by an application executing on a computer system, where each request comprises a user identity, looking up profile information by the application based on the user identity, and evaluating the profile information by the application according to a Boolean rule, where each rule defines a plurality of conditions for satisfying the rule in terms of three or more of gender, location, identity of a mobile application installed on a mobile communication device, age category, and identity of a mobile communication device model. The method further comprises, for a content request that evaluates true in the Boolean rule, scoring the profile information according to a model and sending mobile content to a mobile communication device associated with the profile information whose score exceeds a predefined threshold.

13 Claims, 4 Drawing Sheets

MOBILE CONTENT DISTRIBUTION SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Opportunities for presenting content on a portion of a display of a mobile communication device may occur when a mobile application is launched on the device, when a browser renders user selected content, or at other times. Such opportunities for presenting content may be announced by a content broker to content distributors. The content distributors may be provided with deadlines for responding to the announcements, for example within about 150 ms, within about 200 ms, or within some other relatively short time interval, in order to not irritate the user of the mobile communication device as display frames resize and render in response to lagging content downloads. A single content distributor may provide content propagation services to a plurality of different content owners who each may be promoting a distinctive content campaign.

SUMMARY

In an embodiment, a mobile content distribution system is disclosed. The system comprises a processor, a non-transitory memory, a data store, and a content distribution application stored in the non-transitory memory. The data store comprises profile information about mobile communication users, where the profile information associated with a user is accessible via a user identity and where the profile information comprises three or more of a gender, a location, an identity of a mobile application installed on a mobile communication device, an age category, and an identity of a mobile communication device. The content distribution application, when executed by the processor, receives a first plurality of requests to provide mobile content to a mobile communication device during a content distribution campaign initiation time duration, where each request to provide mobile content comprises a user identity associated with the mobile communication device, provides a first plurality of mobile content responses based on some of the first plurality of requests to provide mobile content, and receives results of the first plurality of mobile content responses, where the results comprise a user identity and indicates at least one of status of presentation of the mobile content on a mobile communication device, status of click through of a presentation of the mobile content, and status of download of a mobile application identified in the mobile content. The content distribution application further generates a plurality of Boolean response rules, where each Boolean response rule defines a plurality of conditions for satisfying the rule in terms of three or more of gender, location, identity of a mobile application installed on a mobile communication device, age category, and identity of a mobile communication device model, looks up profile information in the data store for some of the user identities associated with the received results of the first plurality of mobile content responses, and for each of the looked up profile informations, applies each of the plurality of Boolean response rules to the profile information to determine if the profile information satisfies the Boolean response rule. The content distribution application further scores each of the plurality of Boolean response rules based on the results of the first plurality of mobile content responses according to an audience size associated with the rule and according to a click through rate associated with the rule, selects one of the Boolean response rules based on the scoring, and receives a second plurality of requests to provide mobile content to a mobile communication device, where each request to provide mobile content comprises a user identity associated with the mobile communication device. The content distribution application further looks up profile information in the data store associated with each of the second plurality of requests based on the user identity in the requests, applies the selected Boolean response rule to the profile information looked up for each of the second plurality of requests, and provides a mobile content response for each of the second plurality of requests that evaluates true in the selected Boolean response rule.

In another embodiment, a method of mobile content distribution is disclosed. The method comprises receiving a plurality of mobile content requests to provide mobile content to a mobile communication device by an application executing on a computer system, where each request comprises a user identity associated with the mobile communication device, looking up profile information by the application based on the user identity for each of the mobile content requests, and evaluating the profile information associated with each content request by the application according to a Boolean rule, where each rule defines a plurality of conditions for satisfying the rule in terms of three or more of gender, location, identity of a mobile application installed on a mobile communication device, age category, and identity of a mobile communication device model. The method further comprises, for a content request whose associated profile information evaluates true in the Boolean rule, scoring the profile information by the application according to a targeting model, determining by the application that the score of the profile information associated with the content request exceeds a predefined threshold, and sending mobile content to a mobile communication device associated with the profile information whose score exceeds the predefined threshold.

In yet another embodiment, a method of mobile content distribution is disclosed. The method comprises storing results of distributed content in a data store by an application executing on a computer system, where each result comprises a user identity and a key performance indicator associated with a user response to distributed content, generating a plurality of Boolean rules by the application, where the rules are defined in terms of three or more of gender, location, identity of a mobile application installed on a mobile communication device, age category, and identity of a mobile communication device model, reading profile information associated with each of the user identities in the results of distributed content by the application, and determining which of profile informations of the user identities pass which of the Boolean rules by the application. The method further comprises ranking the effectiveness of the Boolean rules by the application according to audience size and key performance indicators of the results of distributed content, presenting the Boolean rules in ranked order on a user interface along with audience size and key performance indicator by the application, receiving an input selecting one of the Boolean rules from the user interface by the application, and distributing content to mobile communication devices based on evaluating received requests for content based on a user identity in the received request and based on the selected one of the Boolean rules.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
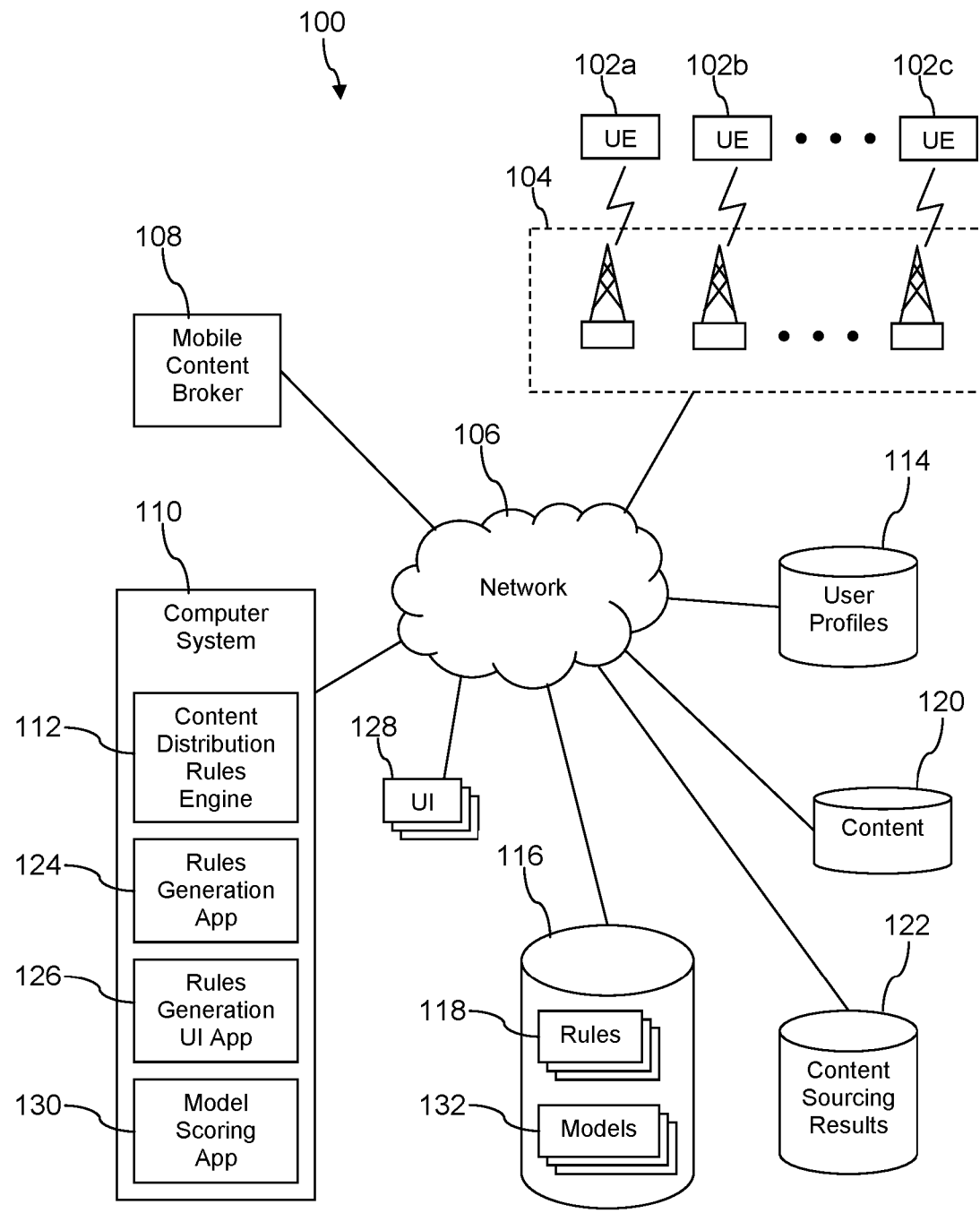
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches automatic generation of rules for performing content distribution. In a communication system for distributing unsolicited content to mobile communication devices in response to user initiated events, content for filling a content presentation opportunity is desirably selected and propagated to a mobile content broker for delivery to the mobile communication devices promptly, for example within about 150 ms, within about 200 ms, or within some other relatively short time interval of receiving notification of the opportunity. An exemplary communication system, discussed further below with reference to FIG. 1, may comprise mobile communication devices, cell sites, a mobile content broker, and a content distribution system. The mobile content broker may be notified by the mobile communication devices (e.g., mobile applications installed on the devices may have a SDK built into them that is configured to notify the broker) when opportunities for presenting unsolicited content arise, for example when a new web page is presented in a browser, when a mobile gaming application is initiated, or in some other event. The mobile content broker may notify a plurality of bidding exchanges, one of which is a content distribution system, of the opportunity to bid. The notification may include information about the mobile communication device that may be useful in evaluating the opportunity to bid or to promote targeting of content to the specific device.

The content distribution system (e.g., a computer system executing one or more applications or computer programs) may receive billions of notifications of content presentation opportunities per day. A content distribution system may pay for the opportunity to satisfy the content presentation opportunity and may perform mathematical analysis to evaluate the economic viability of bidding to fill the content distribution opportunity, for example by scoring the opportunity based on a demographic and/or historical profile of the subject mobile communication device and/or user associated with the mobile communication device. Performing this many mathematical scorings per day, and further considering that many of the scoring actions will not result in tendering of a bid to fulfill the content presentation opportunity, can entail expensive investment in computing resources that may be difficult to recover from the value of presenting unsolicited content on mobile communication devices. The present disclosure teaches automatically generating Boolean rules for evaluating a content presentation opportunity.

A Boolean rule may be a Boolean expression that comprises multiple Boolean sub expressions, where each Boolean sub expression is associated with a single information category of profile information related to a user of a mobile communication device. For example, a first sub expression may define a binary condition for gender (male); a second sub expression may define a binary condition for location (located within the upper-Midwest); a third sub expression may define a binary condition for age (in the age range from 20 to 34 years old). Each Boolean sub expression evaluates to either true or false. The sub expressions may be concatenated into a larger Boolean expression by combining with Boolean OR operators and Boolean AND operators. An efficiency can be realized in evaluating such Boolean rules versus mathematical scoring simply because evaluating Boolean expressions (e.g., the Boolean rules) entail less central processing unit (CPU) machine instructions. Additionally, in many practical Boolean rules, complete evaluation of the Boolean expression can be truncated, thereby saving processing time, when the truth or falsity of the Boolean rule becomes apparent. For example, in evaluating the Boolean rule A (AND) B (AND) C (AND) D, if the expression is evaluated from left to right, if A is determined to be false, the Boolean rule evaluates false and the remainder of the evaluation of B, C, and D can be truncated, thereby saving processing time. Alternatively, if A is true and B is false, again, the Boolean rule evaluates false and the remainder of the evaluation of C and D can be truncated, thereby saving processing time.

When a content presentation opportunity occurs, a content distribution system may look up profile information associated with a user identified in the notification of the opportunity, apply the Boolean rule to the profile information associated with the user, and, if the Boolean rule evaluates true, bids to present content, otherwise, if the Boolean rule evaluates false, no bid is tendered. In an embodiment, the Boolean rule may be used to exclude a portion of content presentation opportunities, and then conventional mathematical scoring may be used to complete evaluation of the other portion of the content presentation opportunities that passed the Boolean rule. This hybrid approach, too, can improve efficiency and reduce processing time in evaluating content presentation opportunities. For example, if 9 out of 10 content presentation opportunities fail to pass the Boolean rule, the system would score only 1/10 the former number of content distribution opportunities. Because the content distribution system may distribute content on behalf of different content owners or third party sources of content, where each different content may be associated with a different Boolean rule, evaluation of multiple Boolean rules may result in two or more true outcomes or a "tie." In such cases, conventional mathematical scoring may be used to break the tie.

Distribution or propagation of content or a plurality of content sourced from the same content owner to a plurality of mobile communication devices, which may be referred to as a content distribution campaign, may be launched and run for a predefined period of time, called an initiation time, for example a week, without any Boolean rule (e.g., bids are submitted for all content presentation opportunities or for some proportion of the opportunities, for example 1 out of 100, 1 out of 1000, 1 out of 10000, or some other partial fraction of all opportunities). The results of the bids may be maintained in a bid history data store or a content sourcing results data store. The historical information may indicate which bids were won, what content was distributed, whether the user of the subject mobile communication device receiving the content clicked on the content (registered a "click through"), whether the user downloaded a mobile application in response to the presented content, and the identity of the user and/or the identity of the mobile communication device.

After the predefined period of initialization for the subject content, a set of Boolean rules are automatically created by the content distribution system taught by the present disclosure. The automatically created Boolean rules may be created based, in part, on clustering theory to achieve a maximum average user selection "distance" between each of the Boolean rules, whereby to promote a desirable coverage of the user profile space (e.g., the range of values that various information categories can take). These automatically created Boolean rules are then tested against the historical data collected from the initiation execution of the content distribution campaign. This set of automatically created Boolean rules may be about 80 different rules, about 100 different rules, about 150 different rules, about 200 different rules, about 400 different rules, or some other number of different rules. Said in another way, the automatically created Boolean rules may be more than 80 but less than 2000 different rules, more than 100 but less than 1500 different rules, more than 150 different rules but less than 1000 different rules, more than 200 but less than 500 different rules.

For each bid that was accepted (e.g., accepted by a content broker that receives events from mobile communication devices and then transmits notifications of content presentation bid opportunities to one or more content distribution systems), the content distribution system of the present disclosure looks up a demographic and/or historical profile of the associated user and/or mobile communication device. The content distribution system of the present disclosure applies each of the automatically created Boolean rules to the demographic and/or historical profile to determine whether the rule evaluates true or false. For each Boolean rule, an audience size is determined (e.g., how many users/devices evaluated true). Additionally, an analysis is performed by the content distribution system of the present disclosure to determine if any rules selected the same sets of audience members (e.g., the same users and/or mobile communication devices), for example with an overlap that exceeds a predefined percentage, for example more than an 80% overlap. Such rules that select substantially the same set of audience members are redundant, and one of the redundant rules may be selected for retention and the other or others may be discarded.

The rules are then evaluated to determine the quality of their selection in reference to the click through rate associated with the audience selected by the rule, in reference to the rate at which a mobile application was installed by the audience selected by the rule, or in reference to another quality criteria. The rules may be ranked according to their quality. Rules that were found to be redundant may be eliminated based on quality ranking (the redundant rule that is ranked higher in quality is retained while the redundant rule of the same pair that is ranked lower in quality is discarded). In an embodiment, the Boolean rule that achieves the highest quality rank may be selected for evaluation by a rules engine in the application. Alternatively, the Boolean rule may be selected based on both the quality ranking as well as the audience size associated with the rules. Said in another way, if the highest ranked Boolean rule by quality has the lowest audience size or if the audience size is below a predefined minimum audience size, a different Boolean rule may be selected. If one of the redundant rules is simpler and hence evaluates more quickly (e.g., has fewer Boolean terms), the simpler rule may be retained and other associated redundant rules discarded.

In an embodiment, the application may provide a user interface for presenting and comparing the Boolean rules, for example with highest ranked rules by quality listed at the top along with corresponding audience size. The user interface may allow specifying a minimum audience size, and then the Boolean rules that satisfy the minimum audience size criteria are listed ranked in quality order. The user may then select which Boolean rule to apply by the rules engine.

The application executing on the content distribution system, after the initiation period and the selection of the Boolean rule for a given content distribution campaign, when it receives a notification of a content presentation opportunity looks up the demographic and historic profile for the user associated with the opportunity, evaluates the opportunity by the rules engine executing the Boolean rule on the demographic and historic profile, and then submitting a bid to distribute content to the subject mobile communication device if the Boolean rule evaluates true or declining to bid if the Boolean rule evaluates false. The results obtained from the content distribution campaign after the creation of the Boolean rule may be periodically analyzed, a plurality of Boolean rules again determined, and a single Boolean rule selected for configuring into the rules engine, as described above. This periodic recreation of the Boolean rule for a content distribution campaign can adapt the Boolean rule based on changing distribution of opportunities. Alternatively, the content distribution system may monitor the quality of the selected Boolean rule, and if the quality of performance of the Boolean rule falls below a threshold (for example falls below 80% of quality observed during an initial roll-out of the subject Boolean rule), then the Boolean rule may be recreated as described above. In some contexts, the Boolean rules may be referred to as Boolean response rules.

Turning now to FIG. 1, a system 100 is described. In an embodiment, system 100 comprises a plurality of mobile communication devices 102 that are communicatively coupled by a radio access network (RAN) 104 to a network 106. For example, a cell site in the RAN 104 may provide a wireless communication link to a device 102 according to a long term evolution (LTE), a code division multiple access (CDMA), a global system for mobile communication (GSM), or a worldwide interoperability for microwave access (WiMAX) wireless communication protocol. The mobile communication devices 102 may make voice telephone calls, may download content for presentation such as web pages, may execute mobile applications such as gaming applications, social network applications, and/or media applications based, at least in part, on communications coupling to the network 106 via the RAN 104. The mobile communication devices 102 may be mobile phones, smart phones, personal digital assistants (PDAs), media players, wearable computers, headset computers, laptop computers, tablet computers, or notebook computers. The network 106 may be one or more private networks, one or more public networks, or a combination thereof. While not shown, a mobile communication device 102 may be communicatively coupled to the network 106 by a wireless link provided by a short range radio access point, for example by a wireless link provided by a Wi-Fi access point, rather than by a cell site in the RAN 104. The teachings of the disclosure apply equally to devices 102 that are communicatively coupled to the network 106 by a short range radio access point.

As users operate the devices 102 events are generated that trigger opportunities to present unsolicited content in a display of the devices 102. For example, a user launches a gaming application on a first device 102a, creating an opportunity for presenting unsolicited content in a banner position at the top of a display of the first device 102a; a user of a second device 102b clicks on a link in a web page to browse to a different web site, creating an opportunity for presenting unsolicited content in a right hand margin of the web page rendered on a display of the second device 102b; and a user of a third device 102c visits a social networking web site, creating an opportunity for presenting unsolicited content in a bottom of screen position of a display of the third device 102c. A mobile content broker 108, communicatively coupled to the network 106, is informed of these events as they occur by the device 102, for example by means of a software development kit (SDK) function built into some of the mobile applications executing on the devices 102.

The content broker 108 sends notification of the opportunity to present unsolicited content on the devices 102 to one or more different content distribution computer systems or content bidders, for example a content distribution computer system 110 communicatively coupled to the network 106. The content distribution computer system 110 may respond to the notification by sending a bid to present content as well as the content itself to the content broker 108. The content broker 108 may select that bid, or another bid from a different content distribution computer system, and transmit the associated content to the device 102 where the content is presented. The presentation of the content can include presenting text, video, and/or animation on a display screen of the device 102. The presentation of the content can further include presenting audio via a speaker of the device 102. The content may be an advertisement. The content may be a political campaign message. The content may be a public service announcement.

In an embodiment, the content distribution computer system 110 comprises a content distribution rules engine 112. When the content distribution computer system 110 receives notification of an opportunity to present unsolicited content, the content distribution rules engine 112 uses an identity of a user included in the notification to access a user profile data store 114 and to read profile information about the user of a mobile communication device 102 and/or about the mobile communication device 102 itself. The content distribution rules engine 112 evaluates the desirability of bidding for the opportunity to present content on the device 102 based on a likelihood that the user will respond favorably to the content. The content may be stored in one or more content data stores 120. This evaluation may be performed using a predefined mathematical scoring model tuned to a specific content (e.g., each different content or content campaign may have its own distinctive mathematical scoring model that is intended to select the desired target profile, each model defining different weighting coefficients for profile factors and possibly relying upon different profile factors), based on an assumed preferred target or preferred user demographic and history profile. A possible shortcoming of this approach, however, is that performing this mathematical scoring for every notification presents a very heavy processing burden on the content distribution computer system 110. Another possible shortcoming of this approach is that the assumed affinity between the target represented in the mathematical scoring model may not, in fact, be a good match for the content (e.g., may not respond as expected to the unsolicited content).

In the present disclosure, the content distribution rules engine 112 evaluates the bidding opportunity, at least in part, based on a Boolean rule associated with a content. If the content distribution computer system 110 is sourcing a plurality of different unsolicited content, for example different content campaigns, the content distribution rules engine 112 may access the profile information associated with the user of the device 102 from the user profile data store 114 and then evaluate this profile information with a different Boolean rule for each different active content campaign. If the Boolean rule evaluates false, the content distribution rules engine 112 does not submit a bid for the subject content. If the Boolean rule evaluates true, the content distribution rules engine 112 may submit a bid to present the content on the device 102. If multiple different Boolean rules evaluate true, for example if a first Boolean rule associated with a first content distribution campaign evaluates true and a second Boolean rule associated with a second content distribution campaign evaluates true, the tie may be broken by evaluating the content distribution opportunity using mathematical model scoring for each different content associated with a Boolean rule that evaluates true. The content distribution rules engine 112 may submit a bid to present the content whose Boolean rule evaluated true and which had the highest mathematical model score.

As an example, notification of a content presentation opportunity may be received by the content distribution computer system 110 from the mobile content broker 108, where the notification includes an identity of a user. The content distribution rules engine 112 looks up a user profile using the identity of the user to search in the user profile data store 114. As an example, suppose this first user is associated with profile information indicating the first user is in the 20-24 year old age category, is a male, is located in the Midwest, has an annual income in the range $35000-$45000, is single, and rents an apartment. The content distribution rules engine 112 may evaluate the suitability of sending a mass market beer ad to this first user based on a Boolean rule that stipulates (20-24 age category) AND (male). Because the Boolean rule, when applied to the profile data associated with the first user, evaluates true, the content distribution rules engine 112 may bid to present a mass market beer advertisement on the device. But the content distribution rules engine 112 may be managing multiple concurrent content distribution campaigns, each having its own Boolean rule. Thus, a second Boolean rule associated with a department store announcing a sale on spring dresses may stipulate ((16-19 age category) OR (20-24 age category) OR (25-34 age category)) AND (female). In this case, the second Boolean rule evaluates false, and the content distribution rules engine 112 does not bid to present the department store ad on the device. In this example, there is no tie, and the content distribution rules engine 112 may bid to present the mass market beer ad on the device. In the case there two or more independent Boolean rules associated with different content distribution campaigns evaluated true, the respective math models of the different campaigns might have been executed to resolve the tie by granting the opportunity to bid to the highest score.

The Boolean rules may be structured to enhance the likelihood that it can be rapidly evaluated. For example, in the above two examples, if the sex profile information is evaluated first, evaluation of the second Boolean rule can be truncated after evaluating that the sex of the first user does not satisfy the rule, whereas if the age profile information is evaluated first, evaluation of the second Boolean rule cannot be truncated. In an embodiment, a rules generation application 124, which automatically generates or creates the Boolean rules as described further below, may structure the Boolean rules to increase the opportunities for truncating Boolean evaluations efficiently when the Boolean rule is going to evaluate false. For example, it may be that evaluating AND operations, where possible, before OR operations may result in more frequent truncation. It may be that evaluating specific elements of profile information first may result in more frequent truncation. For example, if a sex sub expression is present in a Boolean rule in an AND operation, this may be evaluated first because it may be supposed that somewhere around half the content presentation opportunities would be for females and around half for males. Thus, when the sex sub expression ANDed in the Boolean rule is evaluated first, possibly half these Boolean evaluations can be truncated after determining the sex of the user associated with the content distribution opportunity does not meet the criteria. In an embodiment, the algorithm for ordering of sub expressions versus profile information to enhance early truncation of Boolean evaluation may be adapted over time by the rules generation application 124 by analyzing histories of Boolean evaluations by the content distribution rules engine 112.

In an embodiment, the Boolean rules are restricted to evaluating a selected set of profile information. In an embodiment, the Boolean rules may be restricted to sub expressions that evaluate age, sex, location, installed mobile application, and device model. In this embodiment, for example, Boolean rules would not comprise sub expressions which evaluate marital status, income level, educational level, or political affiliation. In another embodiment, however, a different set of profile information may be allowed for building Boolean rules.

The content distribution rules engine 112 may access a data store 116 to obtain Boolean rules 118 associated with different content campaigns. Likewise, the content distribution rules engine 112 may access the data store 116 to obtain mathematical scoring models 132 associated with different content campaigns. In an embodiment, the content distribution rules engine 112 may read Boolean rules 118 and/or mathematical scoring models 132 periodically from the data store 116 and cache the rules 118 and models 132 in memory in the content distribution computer system 110, in order to pick up any changes that may have been made to these rules 118 or models 132. In an embodiment, the content distribution rules engine 112 may periodically check to see if a Boolean rule 118 or mathematical scoring model 132 has changed and only read it or download it if it has in fact changed.

A mathematical scoring model may comprise a sum of weighted factors. For example, each of a plurality of profile information categories may be mapped to a value in the range 0 to 1 or 0 to 10 or some other value range. A weighting coefficient of a model may be defined for the information categories that are of interest to the model. The coefficients may be restricted such that the maximum score possible is a first predefined value and the minimum score possible is a second predefined value, and all scoring models employ coefficients that are restricted in the same way to the same maximum possible score and to the same minimum possible score. Thus, a first scoring model may have the form:

First model score=$0.4(\text{factor}A)+0.6(\text{factor}B)$

And a second scoring model may have the form:

Second model score=$0.4(\text{factor}C)+0.1(\text{factor}D)+0.3(\text{factor}G)+0.2(\text{factor}K)$ If each of the factors (e.g., factor A, factor B, factor C, factor D, factor G, factor K, etc.) is restricted to the same mathematical range, then the maximum score possible in each of the first model and the second model would be equal, promoting comparison between scores of the same user profile reached using different mathematical scoring models. In another embodiment, other scoring models may be used to mathematically score and evaluate suitability of users to receive a content.

During the initiation of a content distribution campaign, the content distribution rules engine 112 may bid for presenting the content associated with the initializing content distribution campaign irrespective of the profile information associated with the subject mobile communication device 102 or associated user. The content distribution rules engine 112 may use some periodic or random selection process to avoid bidding on every content presentation opportunity and to allow other content distribution campaigns to bid on content presentation opportunities. For example, the content distribution rules engine 112 may submit a bid for an initializing content presentation campaign every tenth notification, every one hundredth notification, every one thousandth notification, every ten thousandth notification, or some other number. The results of the bids to present content are stored in a content sourcing results data store 122. The results may be that the user clicked on the content or did not click on the content (clicking on the content may be referred to as a "click through"). The results may be that the user installed a mobile application associated with the content or did not install the mobile application. The results may include other information related to user responses to the content. In general, the results may be deemed key performance indicators (KPIs).

The rules generation application 124 may automatically generate a plurality of Boolean rules and evaluate the effectiveness of each of the Boolean rules based on analyzing the results associated with bids for presenting the content of a content presentation campaign. For example, a plurality of Boolean rules may be automatically generated by the rules generation application 124, the efficacy of each of the automatically generated Boolean rules can be evaluated based on the results stored in the content sourcing results data store 122, and the preferred Boolean rule for the subject content distribution campaign can be configured into the content distribution rules engine 112 and/or stored in a rule 118 in the data store 116. At a high level, this process can be thought of as "guessing" at Boolean rules and then determining which of the guessed Boolean rules would have best selected historical bid opportunities, with the addition that somehow the guesses are well distributed to evenly cover the "guessing" space. Alternatively, this process can be analogized to blindly throwing darts at a dart board and then selecting the dart closest to the bullseye, with the addition that somehow the darts are thrown in such a way that their positions are well distributed to evenly cover the dart board. For example, about 50 Boolean rules may be created, about 100 Boolean rules may be created, about 150 Boolean rules may be created, about 200 Boolean rules may be created, or some other number of Boolean rules may be created and then evaluated for efficacy.

For every bid result stored during the initiation stage of a content distribution campaign, the user profile identified by the user identity in the bid result is looked up in the user profile data store 114. The Boolean rule being evaluated is applied to each different user profile. The total number of times the Boolean rule evaluated true can be viewed as the audience reach of the Boolean rule: how many users and/or mobile devices will the Boolean rule evaluate true for? This audience reach is a useful metric for evaluating a Boolean rule, because the content distribution campaign wants to bid for at least some content presentation opportunities and not zero opportunities. To some extent, the larger the audience the better. On the other hand, the content distribution campaign does not want to be indiscriminate but to bid on opportunities that are deemed to offer an elevated likelihood of leading to a positive user response—for example a user click through response (a user clicking on an advertisement to obtain further information) or a user downloading a mobile application identified in the content. Thus, for every bid that the Boolean rule evaluated to true, a count is tallied if a KPI for the bid was favorable, for example if a click through occurred or if a mobile application was downloaded. This KPI count for a Boolean rule can be viewed as a quality metric.

It is desirable that Boolean score both a high audience reach and a high quality metric, but in practice these may be antagonistic metrics. In practice, in many cases a trade off balance between audience reach and quality metric is struck for selecting the best Boolean rule for a given content distribution campaign. A criteria for making the trade off balance may be input by a content distribution campaign manager, for example via a user interface 128 accessed via a workstation. For example, the user interface 128 may input a minimum audience reach. Alternatively, the user interface 128 may input a weighting ratio of the two factors, for example 50% audience size, 50% quality; or 35% audience size, 65% quality.

The rules generation application 124 may periodically repeat the process of automatically generating and selecting a Boolean rule for a given content distribution campaign, for example daily, weekly, monthly. The rules generation application 124 may repeat the process of automatically generating and selecting a Boolean rule based on a percentage of completion of the content distribution campaign, for example at 50% completion, at 65% completion, and at 80% completion. The rules generation application 124 may repeat the process of automatically generating and selecting a Boolean rule based on a count of bids offered to present the content of the content distribution campaign. The quality metric associated with a content distribution campaign and its current Boolean rule may be tracked and if it falls below a predefined threshold of earlier quality, for example if quality drops off below 80% of initial quality (quality over the first 4 hours of use), the rules generation application 124 may be triggered to repeat the process of automatically generating Boolean rules and selecting a preferred Boolean rule from among the automatically generated Boolean rules.

Note that because the data by which the automatically generated Boolean rules are evaluated may change from iteration to iteration, the selected Boolean rules may change from iteration to iteration. Additionally, in an embodiment, the set of automatically generated Boolean rules may be progressively concentrated on a "sweet spot" of profile information based on learning from previously evaluated Boolean rules. For example, if it is determined that the top 10% of Boolean rules in a previous cycle of rule generation were closely clustered around each other, the set of automatically generated Boolean rules in the next iteration cycle may be restricted to the range of this top 10% of Boolean rules (e.g., 100 new candidate Boolean rules are defined for evaluation where the rules range within the ranges of the top 10% of Boolean rules in the previous iteration).

In an embodiment, a content distribution campaign manager or other person may provide prompts or seeds to the rules generation application 124 for automatically generating Boolean rules. For example, in a given content distribution campaign it may be known that the target user is female, so the campaign manager may input the specification that all Boolean rules include the constraint that all the Boolean rules evaluate false if the sex of the user is male. As another example, a content distribution campaign may relate to a product with a restricted distribution area, so the campaign manager may input the specification that all Boolean rules include the constraint that all the Boolean rules evaluate false if the location of the user is outside the product distribution area). When a prompt or seed is provided, all of the generated Boolean rules (the trial of candidate rules) include a Boolean sub expression capturing the criteria of the prompt.

In an embodiment, the content distribution computer system 110 further comprises a rules generation user interface application 126 which may provide a user interface 128 to a campaign manager for inputting Boolean rule prompts or seeds. Additionally, the rules generation user interface application 126 may provide a user interface 128 to the campaign manager for reviewing the results of evaluation of Boolean rules and allowing the manual selection of the Boolean rule for conducting the content distribution campaign. In this way, the campaign manager may manually choose the trade off to make between audience reach and one or more quality metric score for Boolean rules. The rules generation user interface application 126 may present the Boolean rules listed in ranked order according to the quality metric scores, according to the audience reach scores, or according to a tradeoff weighting specified via the user interface 128 by the campaign manager. The display of the result for a Boolean rule evaluation may indicate the audience reach of the rule as well as the quality metric for the rule. The user interface 128 may provide a selection for drilling down to see the formulation of the expression of the Boolean rule.

While the content distribution computer system 110 has been described as comprising multiple separate computer applications, in an embodiment, one or more of the content distribution rules engine 112, the rules generation application 124, the rules generation user interface application 126, and/or the model scoring application 130 may be combined into a single computer executable application. In an embodiment, the content distribution computer system 110 further comprises a listener component that listens to the results of bids sent to the mobile content broker 108 by the content distribution rules engine 112 and that writes logs on the results to the content sourcing results data store 122. In some contexts, Boolean rules may be referred to as Boolean response rules.

Figure 2:
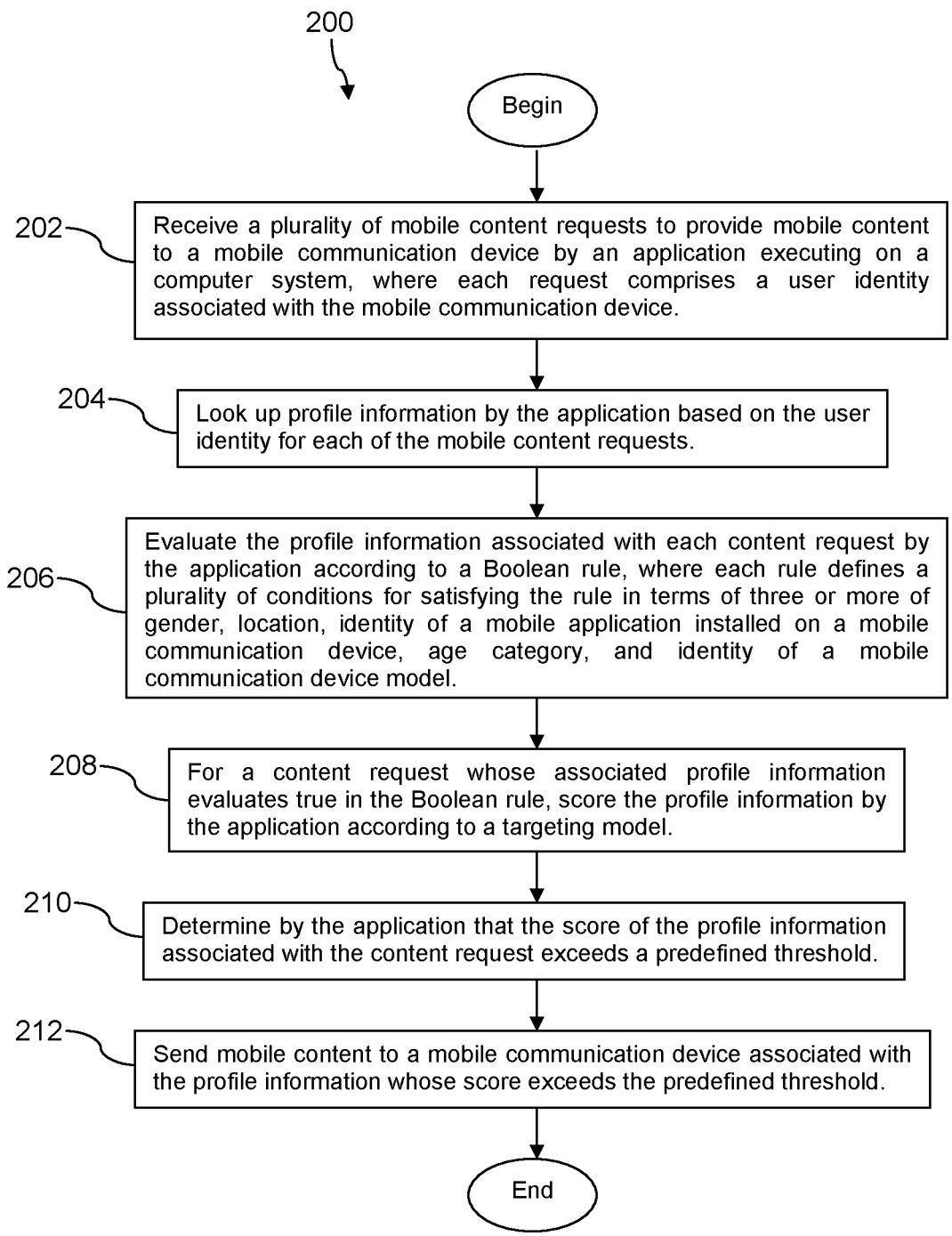
FIG. 2 is a flow chart of a method according to an embodiment of the disclosure.

Turning now to FIG. 2, a method 200 is described. At block 202, receive a plurality of mobile content requests to provide mobile content to a mobile communication device by an application executing on a computer system, where each request comprises a user identity associated with the mobile communication device. At block 204, look-up profile information by the application based on the user identity for each of the mobile content requests.

At block 206, evaluate the profile information associated with each content request by the application according to a Boolean rule, where each rule defines a plurality of conditions for satisfying the rule in terms of three or more of gender, location, identity of a mobile application installed on a mobile communication device, age category, and identity of a mobile communication device model. At block 208, for a content request whose associated profile information evaluates true in the Boolean rule, score the profile information by the application according to a targeting model.

At block 210, determine by the application that the score of the profile information associated with the content request exceeds a predefined threshold. At block 212, send mobile content to a mobile communication device associated with the profile information whose score exceeds the predefined threshold.

Figure 3:
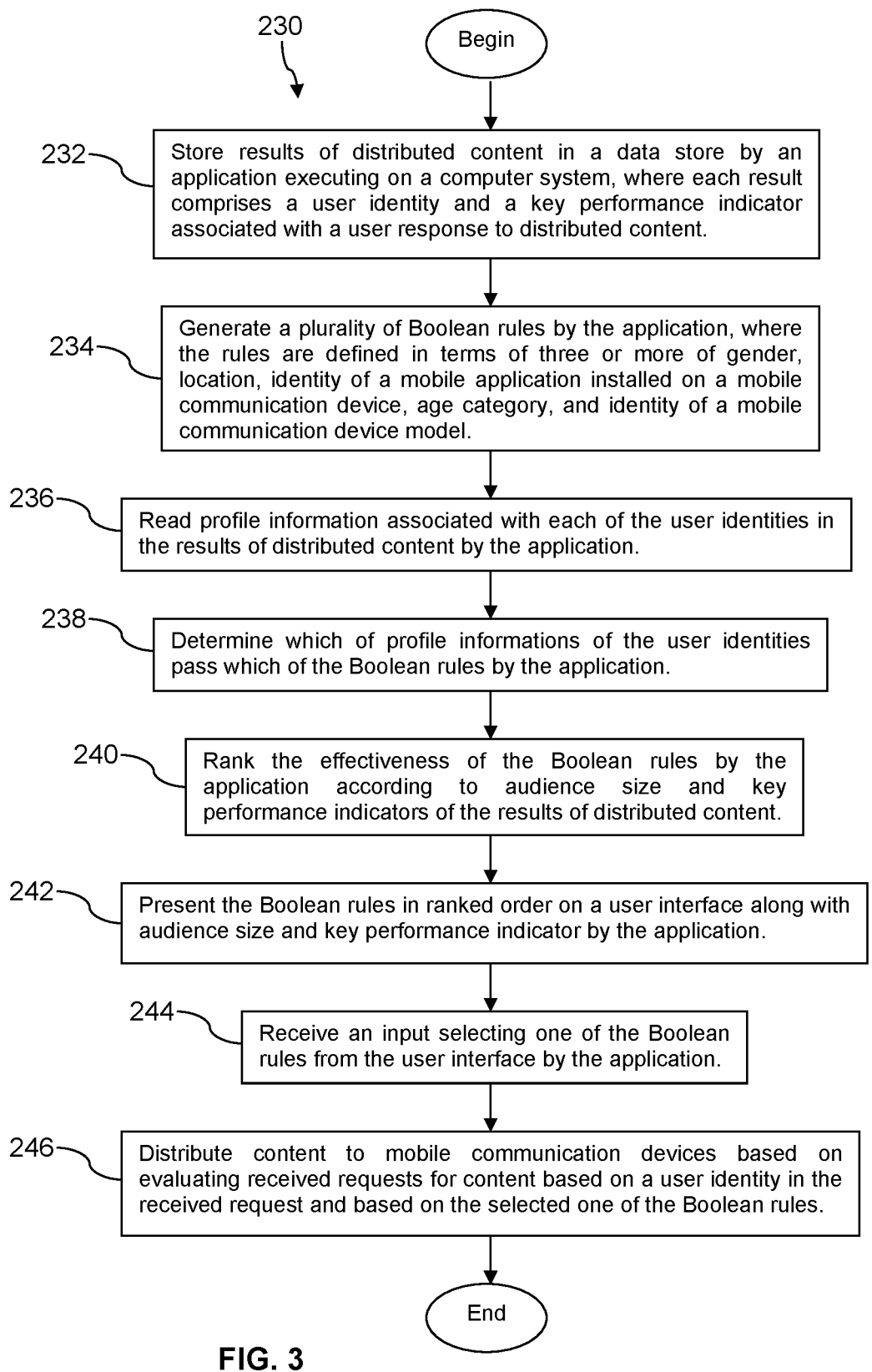
FIG. 3 is a flow chart of another method according to an embodiment of the disclosure.

Turning now to FIG. 3, a method 230 is described. At block 232, store results of distributed content in a data store by an application executing on a computer system, where each result comprises a user identity and a key performance indicator associated with a user response to distributed content. At block 234, generate a plurality of Boolean rules by the application, where the rules are defined in terms of three or more of gender, location, identity of a mobile application installed on a mobile communication device, age category, and identity of a mobile communication device model.

At block 236, read profile information associated with each of the user identities in the results of distributed content by the application. At block 238, determine which of profile informations of the user identities pass which of the Boolean rules by the application. At block 240, rank the effectiveness of the Boolean rules by the application according to audience size and key performance indicators of the results of distributed content.

At block 242, present the Boolean rules in ranked order on a user interface along with audience size and key performance indicator by the application. At block 244, receive an input selecting one of the Boolean rules from the user interface by the application. At block 246, distribute content to mobile communication devices based on evaluating received requests for content based on a user identity in the received request and based on the selected one of the Boolean rules.

Figure 4:
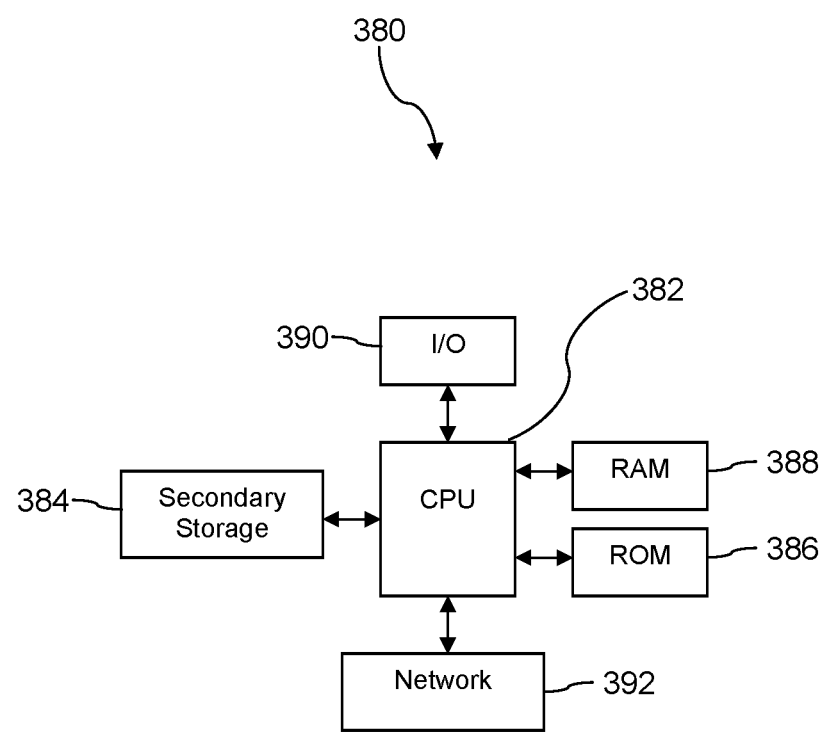
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embedded in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers.

In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile content distribution system, comprising:
a processor;
a non-transitory memory;
a data store comprising profile information about mobile communication users, where the profile information associated with a user is accessible via a user identity and where the profile information comprises three or more of a gender, a location, an identity of a mobile application installed on a mobile communication device, an age category, and an identity of a mobile communication device; and
a content distribution application stored in the non-transitory memory that, when executed by the processor:
    receives a first plurality of requests to provide mobile content to a mobile communication device during a content distribution campaign initiation time duration, where each request to provide mobile content comprises a user identity associated with the mobile communication device,
    provides a first plurality of mobile content responses based on some of the first plurality of requests to provide mobile content,
    receives results of the first plurality of mobile content responses, where the results comprise a user identity and indicates at least one of status of presentation of the mobile content on a mobile communication device, status of click through of a presentation of the mobile content, and status of download of a mobile application identified in the mobile content,
    generates a plurality of Boolean response rules, where each Boolean response rule defines a plurality of conditions for satisfying the rule in terms of three or more of gender, location, identity of a mobile application installed on a mobile communication device, age category, and identity of a mobile communication device model,
    looks up profile information in the data store for some of the user identities associated with the received results of the first plurality of mobile content responses,
    for each of the looked up profile informations, applies each of the plurality of Boolean response rules to the profile information to determine if the profile information satisfies the Boolean response rule,
    scores each of the plurality of Boolean response rules based on the results of the first plurality of mobile content responses according to an audience size associated with the rule and according to a click through rate associated with the rule,
    selects one of the Boolean response rules based on the scoring,
    receives a second plurality of requests to provide mobile content to a mobile communication device, where each request to provide mobile content comprises a user identity associated with the mobile communication device,
    looks up profile information in the data store associated with each of the second plurality of requests based on the user identity in the requests,
    applies the selected Boolean response rule to the profile information looked up for each of the second plurality of requests; and
    provides a mobile content response for each of the second plurality of requests that evaluates true in the selected Boolean response rule.

2. The mobile content distribution system of claim 1, wherein the content distribution campaign initiation time duration is about one week.

3. The mobile content distribution system of claim 1, wherein the content distribution application generates more than 100 Boolean response rules.

4. The mobile content distribution system of claim 1, wherein the content distribution application looks up profile information in the data store for all of the user identities associated with received results.

5. The mobile content distribution system of claim 1, wherein the content distribution application scores each of the plurality of Boolean response rules further according to a mobile application installation rate associated with the rule.

6. The mobile content distribution system of claim 1, wherein the first plurality of mobile content responses comprises one of a text content, a video content, an animation content, or an audio content.

7. The mobile content distribution system of claim 1, wherein the content distribution further:
identifies two Boolean response rules that are associated with more than a predefined threshold of the same mobile content responses and
deletes one of the two Boolean response rules as redundant.

8. A method of mobile content distribution, comprising:
receiving a plurality of mobile content requests to provide mobile content to a mobile communication device by an application executing on a computer system, where each request comprises a user identity associated with the mobile communication device;
looking up profile information by the application based on the user identity for each of the mobile content requests;
evaluating the profile information associated with each content request by the application according to a Boolean rule from among a plurality of Boolean rules, where each rule defines a plurality of conditions for satisfying the rule in terms of three or more of gender, location, identity of a mobile application installed on a mobile communication device, age category, and identity of a mobile communication device model, and wherein prior to evaluating the profile information according to at least one of the plurality of Booleans, the plurality of Boolean rules are evaluated to identify redundant Boolean rules and eliminate the redundancy;

for a content request whose associated profile information evaluates true in the Boolean rule, scoring the profile information by the application according to a targeting model and at least partially according to an audience size associated with the Boolean rule and according to a click through rate associated with the Boolean rule;

determining by the application that the score of the profile information associated with the content request exceeds a predefined threshold; and sending mobile content to a mobile communication device associated with the profile information whose score exceeds the predefined threshold.

9. The method of claim 8, further comprising:

generating the plurality of Boolean rules by the application;

evaluating each of the generated Boolean rules using a log of results of sending mobile content to mobile communication devices; and selecting the Boolean rule used to evaluate the profile information looked up based on the user identity for each of the mobile content requests from the plurality of generated Boolean rules based on the evaluation.

10. The method of claim 9, wherein the application generates at least 100 Boolean rules.

11. The method of claim 8, wherein the mobile content is one of a mobile advertisement, a political notice, or a public service announcement.

12. The method of claim 8, wherein the mobile communication device is one of a mobile phone, a smart phone, a personal digital assistant (PDA), a media player, a wearable computer, a headset computer, a laptop computer, a tablet computer, or a notebook computer.

13. The method of claim 8, wherein the targeting model is a mathematical equation comprising a sum of products, where each product is determined by multiplying a weighting for a factor associated with the product, where each product is one of a plurality of classes of information contained in the profile information.

* * * * *